C. B. KING.
CHANGE SPEED GEARING.
APPLICATION FILED NOV. 1, 1910.
1,134,681.
Patented Apr. 6, 1915.
2 SHEETS—SHEET 2.
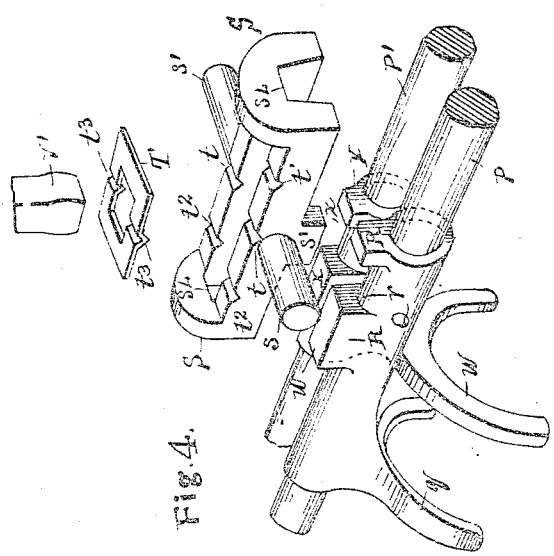
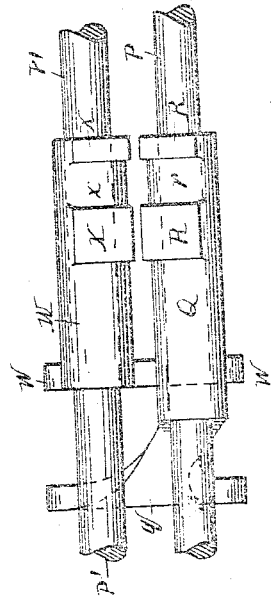
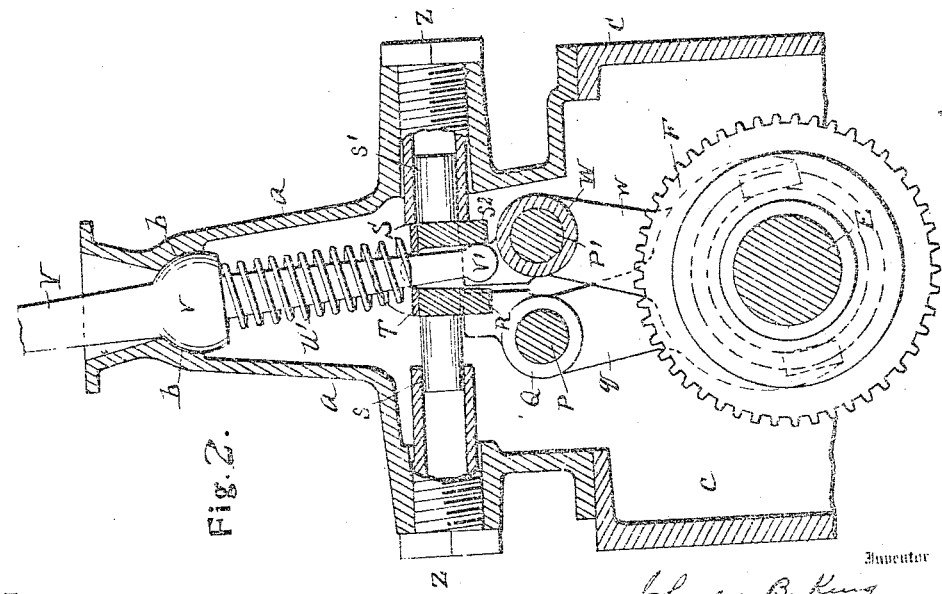

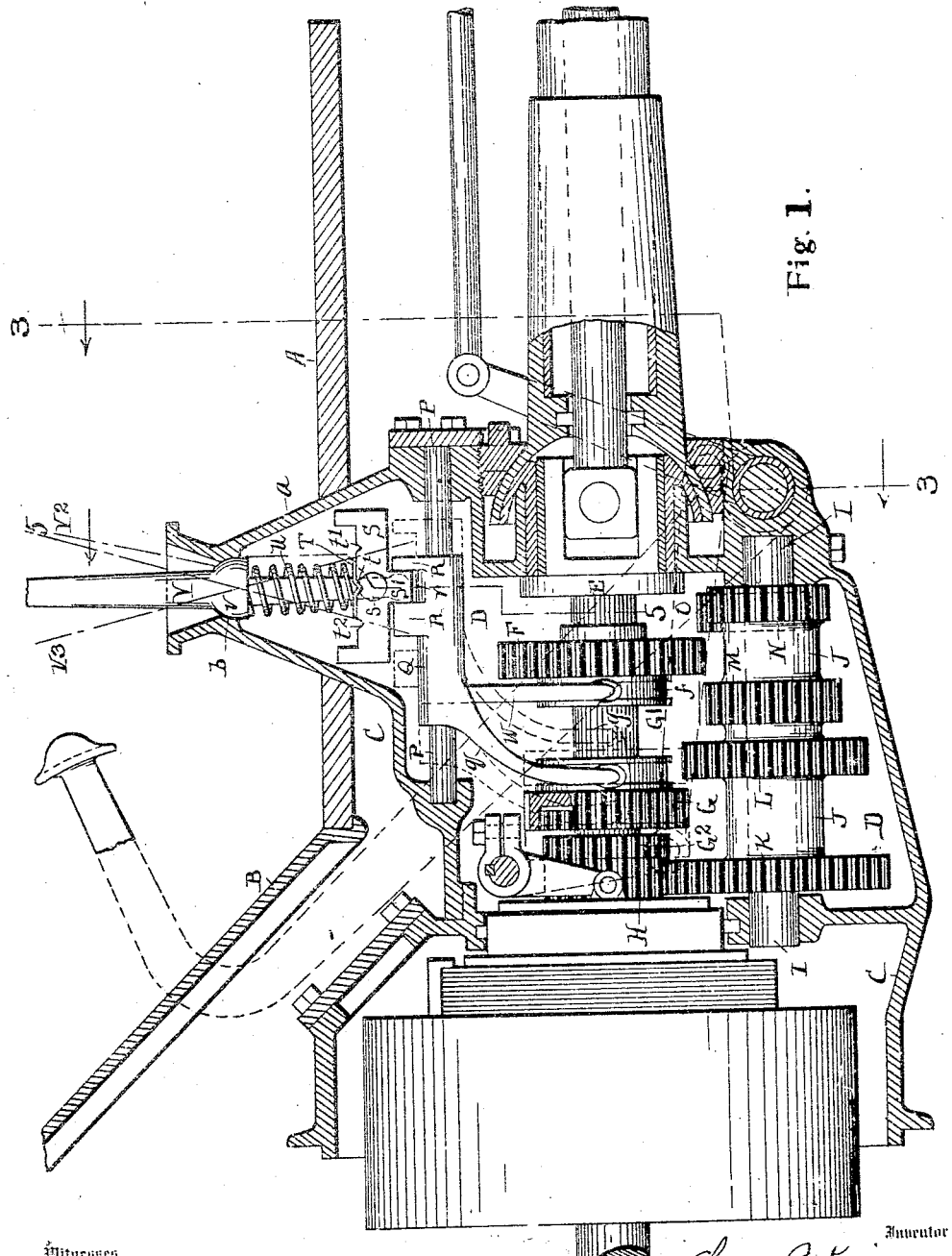

UNITED STATES PATENT OFFICE.

CHARLES B. KING, OF DETROIT, MICHIGAN, ASSIGNOR, BY MESNE ASSIGNMENTS, TO KING MOTOR CAR COMPANY, A CORPORATION OF MICHIGAN.

CHANGE-SPEED GEARING.

1,134,681.  Specification of Letters Patent.  Patented Apr. 6, 1915.

Application filed November 1, 1910. Serial No. 590,143.

*To all whom it may concern:*

Be it known that I, CHARLES B. KING, a citizen of the United States, residing at Detroit, county of Wayne, State of Michigan, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

My invention relates to change speed gearing and the object of my improvements is to provide an improved mechanism through which the power is transferred from the driving to the driven shaft with different angular velocity ratios and especially to secure compactness and economize space and to secure directness of action in the apparatus through which the gearing is manipulated. To this end I make the hand lever and parts connecting the same with the gearing substantially a part of said gearing, all of the actuating parts being inclosed in the same casing with the change speed gearing except that the lever projects through the casing so that at its upper end it may be accessible to the operator at the position for "center control" of the change speed gearing. I accomplish this object in the device illustrated in the accompanying drawings, in which,—

Figure 1, is an elevation of mechanism embodying my invention, the casing being shown in section and some adjacent parts. Fig. 2 is a section on the line 5—5 of Fig. 1, looking in the direction of the arrow. Fig. 3, is a detail plan view showing the guide rods and sleeves thereon, which sleeves carry the forks by which the gears are shifted to make the different engagements for the different speeds. Fig. 4, is a detail perspective view of the shifting mechanism, the parts being separate to show their construction.

The change speed gearing itself is of a well-known type but will be briefly described so that the application of my invention thereto will be readily understood.

A, represents the front part of the floor of the body of an automobile and B, the foot-board.

C, is the casing of the change speed gearing and D, indicates such gearing as a whole.

H, is a gear wheel upon the end of the driving shaft and E, is a driven shaft axially in line with said driving shaft.

F, is a gear wheel adapted to slide upon the shaft E but restrained from angular motion relative thereto. $f$, is a grooved collar upon the gear wheel F.

G, is a gear wheel of less diameter than the gear wheel F, secured upon the shaft E in the same way as the wheel F. $g$, is a grooved collar upon the gear wheel G by which said gear wheel may be adjusted longitudinally of the shaft E. The gear wheel G is hollow upon one side and provided with internal teeth adapted to engage the external teeth of the gear wheel H when moved to the position indicated in dotted lines at $G^2$, Fig. 1, so as to bind the shaft E to the gear wheel H and connect the driving and driven shafts directly.

I, is a cylindrical arbor secured at both ends in the gear casing in a position parallel to the driving and driven shafts.

J, J, is a sleeve upon the arbor I.

K, is a gear wheel on the sleeve J, its teeth permanently engaging the teeth of the gear wheel H so that the rotation of the driving shaft is transmitted to the sleeve J through said gear wheels.

L, is a gear wheel upon the sleeve J located some distance from the gear wheel K, and of such diameter that when the gear wheel G is moved into the same plane therewith, the teeth of said gear wheels engage.

M, is a gear wheel upon the sleeve J of such diameter that when the gear wheel F is moved into the same plane, the teeth of said gear wheels shall engage.

N, is a gear wheel on the sleeve J, its teeth engaging the teeth of a gear wheel O, which is pivoted upon an arbor in the casing C.

When the gear wheel F is moved into a plane with the gear wheel O, the teeth on said gear wheels engage and motion is transmitted from the sleeve J through the gear wheel N to the gear wheel O, and to the gear wheel F, so that with this engagement the shaft E is rotated in the opposite direction to that in which it is turned with the engagements previously described, and a reverse motion of the shaft E is secured.

To provide means for adjusting the parts of the change speed gearing, as above described, I have provided an apparatus which I will now describe.

P, P¹, are guide rods located parallel to each other in the upper part of the casing C.

Q, (Fig. 1) is a sleeve adapted to reciprocate upon the guide rod P and having a fork $q$ depending therefrom and engaging in the groove of the collar $g$ so that by reciprocating the sleeve Q, the gear wheel G is moved longitudinally along the shaft E.

R, R, are lugs rising from the sleeve Q.

$r$, indicates a groove or slot between the lugs R, R.

W, is a sleeve adapted to reciprocate on the rod P¹ and provided with a depending fork $w$ which engages in the groove of the collar $f$ so that by moving the sleeve W along the rod P¹ the gear wheel F is moved to different positions longitudinally of the shaft E.

X, X, are lugs similar to the lugs R, R, above described, but rising from the sleeve W.

When the sleeve Q is at its position farthest toward the front of the car, as indicated in dotted lines at G², Fig. 1, the gear wheel G engages the gear wheel H and the driving and driven shafts are bound directly together. When said sleeve is at its intermediate position, as shown in full lines in said figure, the gear wheel G is free. When the sleeve Q is farthest toward the rear of the car as shown in dotted lines at G¹ in Fig. 1, the gear wheel G is in the same plane as the gear wheel L, and the teeth of said gear wheels engage so that the rotation of the sleeve J is communicated from said gear wheels at an intermediate speed to the shaft E.

When the sleeve W is farthest toward the front of the car, the gear wheel F engages the gear wheel M and the low speed of transmission is secured. When said sleeve is farthest toward the rear of the car, the gear wheel F engages the gear wheel O and the reverse speed is secured. When said sleeve is in its intermediate position, the gear wheel F is free.

When the sleeves Q and W are in their intermediate position, slots $x$ and $r$ are in line with each other, as indicated in the perspective of Fig. 4, and the shaft E is free from the sleeve J, the parts being in their neutral position and the driven shaft being free from the driving shaft.

S, is a saddle provided with laterally extending arbors $s$, $s^1$, which arbors extend into sockets Z, Z (Fig. 2) and are adapted to reciprocate therein so that the position of the saddle S may be shifted laterally guided by said arbors, engaging in said sockets.

S¹, S², are lugs, one of which extends downward at the center at each side of the saddle S. These lugs are of a size to fit into the grooves or slots $r$, $x$, in the sleeves Q, W, to lock said sleeves and prevent their longitudinal motion. When the saddle S is at its extreme position on one side, lug S² indicated in dotted lines, is laterally beyond the sleeve W and the lug S¹ engages in the slot $r$. When the saddle S is at its extreme position at the other side, the lug S² engages in the slot $x$ and the lug S¹ is beyond the sleeve Q so as to leave said sleeve free to move. On the upper surface of the saddle S are V-shaped grooves $t$, $t^1$, $t^2$, extending laterally across said saddle.

T, is a plate resting upon the upper surface of the saddle S and provided with downwardly-extending V-shaped projections $t^3$, adapted to engage in the grooves $t$, $t^1$, or $t^2$.

$a$, is a cover for the change-speed-gearing casing C. The cover $a$ extends upward in the form of the frustum of a cone, the upper part being open and provided with a socket $b$. The guide rods P, P¹, are supported in this cover.

V, is a lever having a part of a ball $v$ formed thereon which bears against the socket $b$ to form a ball and socket joint. The socket $b$ is so formed that the lever V is restrained from motion upward, but is free to move downward so far as the ball and socket joint is concerned.

U, is a compression spring bearing against the under side of the ball $v$ and upon the upper surface of the plate T so that the lever V is held firmly in the joint $b$, $v$, and the plate T is pressed resiliently against the upper surface of the saddle S. There is an aperture through the plate T and the lever V fits therethrough at its lower end. The lower end of the lever V, which is indicated by the reference letter V¹, is adapted to fit in the slot or groove $r$ or $x$, and the lower end of said lever fits into the longitudinal slot SL which passes through the saddle S, said lever filling said slot laterally.

It will be noticed that in the above described device the controlling lever V passes directly into the change speed gearing casing.

The operation of the above described device is as follows:—When the lever V is in its intermediate or vertical position, laterally, the saddle S is in its intermediate position. Lugs S¹, S², engage respectively in the slots $r$, $x$ and the lower end V¹ of the lever V also engages in both of these slots so that all parts are locked in the neutral position of the gearing with the driving and driven shafts free from each other. When the upper end of the lever V is moved to the right hand side of the vehicle, the saddle S is at the extreme lateral position, in which the lower end of the lever V engages in the slot $x$ in the sleeve W, the lug S¹ is in the slot $r$ of the sleeve Q thus locking the last mentioned sleeve from longitudinal motion, and the lug $S^2$ is laterally beyond the sleeve W so as to leave the same free to move longitudinally. At the intermediate position of the lever V longitudinal of the vehicle the projections $t^3$, engage in the slot $t^4$, so as to yieldingly hold the lever in this position. When the handle of the lever V is now pressed forward the sleeve W is moved along its guide rod $P^1$ to the position shown in Fig. 10, in which gear wheel F engages the gear wheel O, and a reverse motion is transmitted to the driven shaft E. In this position the projections $t^3$ engage in the slots $t^2$, and yieldingly holds the lever V in this adjusted position. If, however, the handle of the lever V is moved backward, the sleeve W is moved to the position in which the gear wheel F engages the gear wheel M, and the adjustment is for the low speed of transmission. At this latter position the projections $t^3$ engage in the slots $t^2$ and the lever V is yieldingly held in this adjusted position. If the lever arm V is returned to the intermediate position and the handle is then shifted to the left hand side, the saddle S will be moved over to the position in which the lug $S^1$ is laterally beyond the sleeve Q so that said sleeve is free to move longitudinally and the lug $S^2$ engages in the slot $x$ in the sleeve W so as to lock the latter sleeve from longitudinal motion. If the handle of the lever V is moved toward the front of the vehicle, the sleeve Q will be moved to the position in which the gear wheel G engages the gear wheel L, and the parts are adjusted for the intermediate speed of transmission. In this position, the lever arm V is yieldingly held by the engagement of the projections $t^3$, in the slots $t^4$, as above described. If the handle of the lever V is now moved toward the back of the vehicle to its extreme position, the sleeve Q is moved toward the front and the gear wheel G, engages the gear wheel H, so as to directly lock the driving and driven shafts together. In this position, the lever V is yieldingly locked by the projections $t^3$ engaging in the slots $t^2$, as above described.

What I claim is:—

1. The combination of a change speed gearing of the selective type, a casing inclosing said gearing, a lever engaging the selective mechanism of said gearing, at its lower end and extending through said casing to a position at its upper end accessible to the operator, said lever being pivoted by a universal joint to said casing at the point at which it passes through said casing.

2. The combination of a change speed gearing of the selective type, a casing inclosing said gearing and provided with an upward extension, a lever engaging the selective part of said gearing in said casing and extending through said casing at the upper end of the projection from the same to a position at its upper end accessible to an operator, said lever being secured by a universal joint at the point where it passes through said casing at the upper end of said projection.

3. The combination of a change speed gearing of the selective type, a casing inclosing said gearing, a lever engaging the selective mechanism of said gearing in said casing at its lower end and extending through said casing to a position accessible to an operator at its upper end, and a ball-and-socket joint uniting said lever to said casing where the lever passes through said casing, the ball of said joint closing the opening in said casing through which said lever extends.

4. The combination with a change speed gearing of the selective type, a casing inclosing said gearing and engaging the selective mechanism of said gearing in said casing at its lower end and extending through said casing to a position accessible to an operator at its upper end, a socket formed in the wall of said casing around said lever with its cavity opened to the interior of said casing, a ball on said lever adapted to fit in said socket, and a spring within said casing pressing said ball against said socket.

5. The combination with a change speed gearing of the selective type, a casing inclosing said gearing and engaging the selective mechanism of said gearing in said casing at its lower end and extending through said casing to a position accessible to an operator at its upper end, a socket formed in the wall of said casing around said lever with its cavity opened to the interior of said casing, a ball on said lever adapted to fit in said socket, and a spring within said casing pressing said ball against said socket, a yielding engaging apparatus to mark the different positions of the gearing parts within said casing, said spring also acting to cause the engagement of the parts of said yielding engaging apparatus.

In testimony whereof, I sign this specification in the presence of two witnesses.

CHARLES B. KING.

Witnesses:
VIRGINIA C. SPRATT,
ELLIOTT J. STODDARD.